United States Patent
Melton

(10) Patent No.: US 10,938,705 B2
(45) Date of Patent: Mar. 2, 2021

(54) LOW-COST, REALISTIC, PERFORMANCE TEST BED FOR AN ELECTRONIC TRADING VENUE

(71) Applicant: THOMSON REUTERS GLOBAL RESOURCES UNLIMITED COMPANY, Baar (CH)

(72) Inventor: Hayden Paul Melton, Philadelphia, PA (US)

(73) Assignee: Refinitiv US Organization LLC, New York, NY (US)

( * ) Notice: Subject to any disclaimer, the term of this patent is extended or adjusted under 35 U.S.C. 154(b) by 269 days.

(21) Appl. No.: 15/897,226

(22) Filed: Feb. 15, 2018

(65) Prior Publication Data
US 2018/0234331 A1  Aug. 16, 2018

Related U.S. Application Data

(60) Provisional application No. 62/459,635, filed on Feb. 16, 2017.

(51) Int. Cl.
*H04L 12/26* (2006.01)
*G06Q 40/04* (2012.01)
*H04L 29/06* (2006.01)

(52) U.S. Cl.
CPC ............ *H04L 43/50* (2013.01); *H04L 43/106* (2013.01); *G06Q 40/04* (2013.01); *H04L 69/16* (2013.01)

(58) Field of Classification Search
CPC ........ H04L 43/50; H04L 43/106; G06Q 40/04
See application file for complete search history.

(56) References Cited

U.S. PATENT DOCUMENTS

| | | | | |
|---|---|---|---|---|
| 5,881,237 A | * | 3/1999 | Schwaller | H04L 43/50 709/224 |
| 7,523,198 B2 | | 4/2009 | Wu | |
| 2013/0103821 A1 | * | 4/2013 | Gonia | H04W 24/06 709/224 |
| 2015/0073970 A1 | * | 3/2015 | Merold | G06Q 40/04 705/37 |
| 2015/0127519 A1 | * | 5/2015 | Melton | G06Q 40/04 705/37 |

(Continued)

OTHER PUBLICATIONS

Extended European Search Report in European Application No. 18156857.7, search completed May 17, 2018, 13 pages.

*Primary Examiner* — Chris Parry
*Assistant Examiner* — Steven C Nguyen
(74) *Attorney, Agent, or Firm* — Sheppard Mullin Richter & Hampton LLP

(57) ABSTRACT

A system and method is disclosed for realistic performance testing of a computer network (e.g., a computer network of an electronic trading venue) based on a customizable test scenario, designed by users, executed using a plurality of independent computer nodes each connected to the computer network via its own physical connection to a network device (e.g., network switch) of the computer network. Using the system, developers may design a test scenario that includes testing parameters, which include computer executable code for transmission to and execution at the plurality of computer nodes. The computer executable code may simulate network traffic between devices of market participants and the electronic trading venue.

26 Claims, 3 Drawing Sheets

(56) References Cited

U.S. PATENT DOCUMENTS

| | | | |
|---|---|---|---|
| 2015/0257021 A1* | 9/2015 | Curley | H04W 4/023 709/224 |
| 2016/0078539 A1* | 3/2016 | Ignatovich | G06Q 40/06 705/37 |
| 2016/0104242 A1 | 4/2016 | Melton | |
| 2016/0125533 A1* | 5/2016 | Davis | G06Q 40/04 705/37 |
| 2020/0342536 A1* | 10/2020 | Bonig | G06Q 10/1093 |

* cited by examiner

LOW-COST, REALISTIC, PERFORMANCE TEST BED FOR AN ELECTRONIC TRADING VENUE

RELATED APPLICATIONS

This application claims priority to U.S. Provisional Ser. No. 62/459,635, entitled "Low-Cost, Realistic, Performance Test Bed for an Electronic Trading Venue," filed on Feb. 16, 2017, the entirety of which is hereby incorporated by reference herein.

FIELD OF THE INVENTION

The invention relates to a system and method of realistic performance testing of an electronic trading venue using a master control application that generates a customizable test scenario based on user input and executes the test scenario by transmitting computer executable code to each of a plurality of distinct computer nodes, where each of the nodes is coupled to a network device via its own physical connection to enable distributed execution of the test scenario across multiple distinct physical connections, and monitoring network traffic that flows through the network device to analyze data packets sent from the nodes to the network device via the physical connections.

BACKGROUND OF THE INVENTION

Realistic performance testing of large-scale distributed systems is a non-trivial undertaking. In conventional approaches to performance (or load) testing of a distributed system, a single host computer (or limited number of host computers) may be connected to the system being tested via a single high-bandwidth network interface card to simulate requests to and consume responses from it. If, with reference to the OSI network model, the transport protocol used to send and/or receive these requests is TCP/IP, then each single agent may establish over its (single) network interface card a plurality of such TCP/IP connections. These connections may be multiplexed over a single physical connection (wire or fiber optic cable). In these conventional approaches, multiple "logical" agents (TCP/IP connections) may be simulated from a single "physical" agent (computer). Further in these conventional approaches, it may be sufficient to timestamp requests and responses by inserting that data at the application level and not at the network level.

In these conventional approaches, simulating a plurality of agents from a single computer over a single physical network connection does not realistically test the performance of a computer network. This is because in modern computer networks, each physical connection serializes data (i.e., imposes a total ordering on it) even if the application code to send it is written so as to seemingly send each copy of it to multiple recipients at the same exact time.

This problem is exacerbated when testing certain computer networks, such as an electronic trading venue (also referred to herein as "ETV") because of the requirements and technical issues specifically that arise out of executing an ETV. For example, an ETV requires short response times and must ensure temporal fairness with respect to access to the ETV, which are well-known technical problems with data transmission to and from an ETV.

Furthermore, in modern ETVs, most interactions with an ETV is "algorithmic"—computers receive market data update (and other) events and send orders to an ETV responsive to those events. While it may be acceptable for a human being to wait for a response from a distributed application for hundreds of milliseconds, it is far less acceptable to cause such a wait for an algorithmic agent interacting with that distributed system.

Additionally, many ETVs operate with first-in-first-out (FIFO) rules for processing messages received by market participants. The result is that minute (even microseconds) differences in response times among market participants may cause massive differences in the allocation of scarce resources among those participants on the ETV. Thus, ensuring temporal fairness on an ETV requires ensuring, at increasingly high levels of precision (i.e., at the level of microseconds or perhaps even nanoseconds), that market participants can all receive and act upon information emanating from that ETV at substantially the same time.

Largely as a result of the above, simulating a plurality of agents (market participants) from a single computer over a single physical network connection does not accurately test the performance of an ETV, let alone temporal fairness exhibited by that ETV.

These and other drawbacks exist with network testing of computer networks and in particular to testing temporal fairness of an ETV.

SUMMARY OF THE INVENTION

The invention relates to a system and method of realistic performance testing of a computer network (e.g., a computer network of an ETV) based on a customizable test scenario, designed by users, executed using a plurality of independent computer nodes each connected to the computer network via its own physical connection to a network device (e.g., network switch) of the computer network. Using the system, developers may design a test scenario that includes testing parameters, which include computer executable code for transmission to and execution at the plurality of computer nodes.

The system may include a master test controller that obtains the test scenario and transmits the computer executable code to each of the plurality of computer nodes. The computer executable code may program the computer nodes to participate in network activity with the computer network via the network device, and may do so in accordance with one or more other testing parameters. In this manner, the system may perform realistic testing of a computer network by transmitting computer executable code to computer nodes that each have its own physical connection to the computer network being tested. During execution of the test scenario, the participating computer nodes transmit data to and/or receive data from the computer network via their respective physical connections to the network device, as programmed by the computer executable code they each received. In particular, the computer executable code may program each of the computer nodes to simulate network activity (e.g., submission of bids, receipt of market updates, etc.) of computer devices of market participants of the electronic trading venue.

The network device may be programmed to inject network-level timestamps on data packets transmitted through the network device. The timestamped data packets may be duplicated for transmission to a storage device (e.g., a test scenario database) for later retrieval and analysis, and the data packets may be forwarded to its intended destination (whether the computer network being test or a computer node).

The timestamped data packets and/or other testing information may be retrieved from the test scenario database and analyzed to determine the performance of the computer network during the test scenario. For example, the fairness of an electronic trading venue may be measured based on the testing information from the test scenario database. It should be noted that each test scenario and corresponding data may be stored in association with a test scenario identifier. As such, multiple test scenarios may be executed simultaneously or in series using all or a portion of computer nodes available for testing.

A test scenario may include various test parameters used to execute a network test of a computer network based on multiple distinct computer nodes that each have physical connections to a network device of the network. In particular, a test scenario may include test parameters used to test the fairness of an ETV based on a set of distributed computer nodes that are each programmed to simulate data packet transmissions to and/or from the electronic trading venue.

The computer executable code transmitted to a node may program that node to perform various actions. These actions may be encoded into the code to simulate market participant activity or other network activity with real-world (non-testing) conditions. Non-limiting examples of actions may include subscribing to market data, executing a simulated trading strategy, entering bids and/or offers on instruments trading at the electronic trading venue, and/or performing other actions to simulate network traffic to and/or from a computer network and in particular to an electronic trading venue.

The computer executable code—which may vary on a per recipient (node) basis—may specify which instruments on the ETV to subscribe to, the manner in which to subscribe to them (e.g., market-by-order, market-by-price, full depth or top N-levels of depth, conflated or real-time, etc.) depending on what market data subscription options are offered by the ETV. The executable code may also specify when, on what instrument(s), at what size and quantity each individual single-board computer should send orders, cancels and replace requests to the ETV. In this manner, the network effects of different strategies employed by different market participants may be simulated, measured and assessed.

In addition to or instead of different trading strategies, the computer executable code may program a node to alter its behavior. For instance, the computer executable code may program a node to implement a custom TCP/IP stack that deviates from the TCP/IP specification. As such, the computer executable code may program the node to implement a custom TCP/IP stack instead of a built-in TCP/IP stack ordinarily implemented by the node. Doing so may simulate a market's participant's attempt to "game" communications with an electronic trading venue to reduce its latency.

The foregoing examples of trading strategies and behaviors are non-limiting examples. Other trading strategies and behaviors may be encoded by computer executable code for transmission to and execution by a node as well.

The system may examine a test scenario for execution. For instance, when a scenario initiation trigger is detected (e.g., when a developer indicates a test should be conducted or when other testing conditions have occurred), the system may obtain, from the test scenario database, test parameters associated with the test scenario. The system may identify computer nodes that are available to participate in the network test and transmit computer executable code and/or other parameters to each of a plurality of computer nodes, which are physically distinct from one another. A computer node may be available for participating if, for example, it has enough capacity to execute a test, is currently idle, is part of a larger set of nodes (such as in a server rack), and/or is otherwise deemed to be capable of executing the computer executable code to participate in the test scenario.

In some implementations, the test scenario may specify that different nodes be provided and programmed with different computer executable code to each implement different strategies and/or behave in customized ways. In these implementations, the system may transmit a first set of computer executable code to a first node and a second set of computer executable code (different than the first set of computer executable code) to a second node. The first set of computer executable code may program the first node to implement the first trading strategy and the second set of computer executable code may program the second node to implement the second trading strategy.

In some implementations, the test scenario may specify particular ones of the nodes to participate, a number of nodes that should be used (including a minimum number, a maximum number, a specific number, etc.), and/or other specification of nodes. In some implementations, the system may automatically select nodes to participate in the test scenario from among available nodes. Particular nodes may be identified based on a node identifier (e.g., an IP address, a MAC address, etc.) that uniquely identifies a node. These node identifiers may be stored in a node ID database.

In an implementation, each node may include one or more processors, one or more storage devices, a test agent, and/or other components. The test agent may program the node to periodically poll a master test controller to pull test parameters and/or receive a pushed set of test parameters from the master test controller. In either instance, the test agent may obtain the test parameters and configure the node to act in accordance with the test parameters.

During execution of a test scenario, a node may send orders to and receive market data and acknowledgements for orders from network device (of the ETV). The network device may forward some or all messages (e.g., in the form of data packets) it sends and receives from the nodes to both: (i) the test scenario database and (ii) an intended recipient (whether a node or the ETV).

For example, the network device may forward the messages via port mirroring, in which messages received and sent on designated ports are timestamped with their sending/receiving time at the network device itself, and forward the messages from output port(s) on the network device to an intended recipient. The intended recipient may include one or more nodes, and the messages may be transmitted to test scenario database for storage therein.

In an implementation, the system may obtain the test data associated with a test scenario. For instance, timestamped data packets stored in association with the scenario ID may be obtained from the test scenario database. The content of the timestamped data packets may then be processed and assessed by the scenario analyzer based on the timestamps and content of the packets. In a particular example, the system may determine a temporal fairness of the ETV based on the timestamped data packets, in a manner consistent with that described in U.S. patent application Ser. No. 14/930,499, entitled, "Systems and methods for quantifying temporal fairness on electronic trading venues," filed on Nov. 2, 2015, the contents of which are incorporated in its entirety herein.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
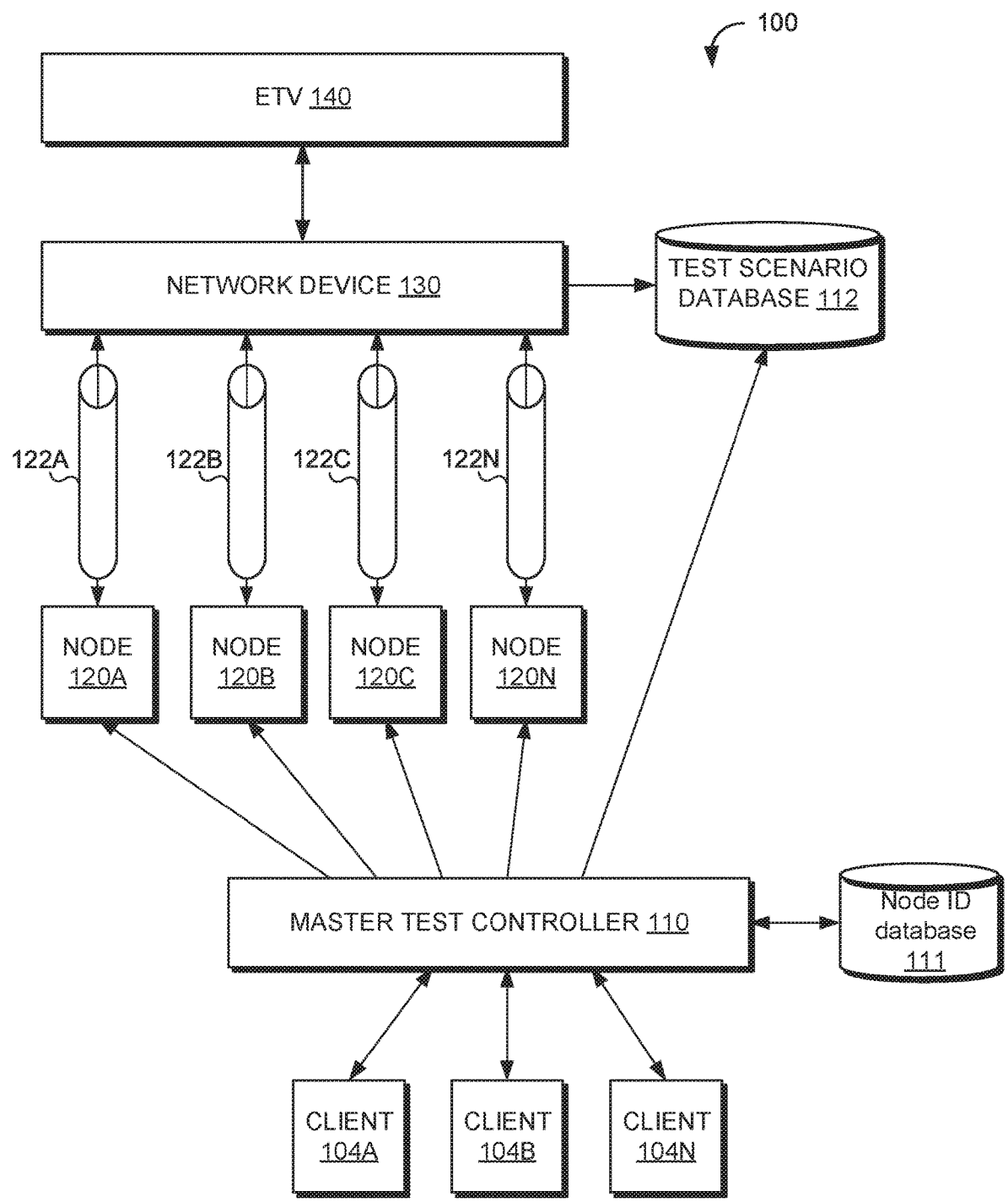
FIG. 1 illustrates a system for performing realistic performance testing of an electronic trading venue based on distributed computer nodes each physically connected to a network device of the electronic trading venue, according to an implementation of the invention.

The invention relates to a system and method of realistic performance testing of a computer network based on a customizable test scenario, designed by users, executed using a plurality of independent computer nodes each connected to the computer network via its own physical connection. Using the system, developers may design a test scenario that includes testing parameters, which include computer executable code for transmission to and execution at the plurality of computer nodes (also referred to interchangeably as simply "node" or "nodes").

The system may include a master test controller that obtains the test scenario and transmits the computer executable code to each of the plurality of computer nodes. Each computer node is connected to the computer network (such as an electronic trading venue) via its own connection (different from physical connections of other computer nodes) to a network device (e.g., a switch) of the computer network. The computer executable code may program the computer nodes to participate in network activity with the computer network via the network device, and may do so in accordance with one or more other testing parameters. In this manner, the system may perform realistic testing of a computer network by transmitting computer executable code to computer nodes that each have its own physical connection to the computer network being tested. During execution of the test scenario, the participating computer nodes transmit data to and/or receive from the computer network via their respective physical connections to the network device, as programmed by the computer executable code they each received. In particular, the computer executable code may program each of the computer nodes to simulate network activity (e.g., submission of bids, receipt of market updates, etc.) of computer devices of market participants of the electronic trading venue.

During execution of the test scenario, the transmission of data between the computer nodes and the computer network may be monitored. This may be accomplished in various ways. For example, the network device may be programmed to inject network-level timestamps on data packets transmitted through the network device. The timestamped data packets may be duplicated for transmission to a storage device (e.g., a test scenario database) for later retrieval and analysis, and the data packets may be forwarded to its intended destination (whether the computer network or a computer node).

The timestamped data packets and/or other testing information may be retrieved from the test scenario database and analyzed to determine the performance of the computer network during the test scenario. For example, the fairness of an electronic trading venue may be measured based on the testing information from the test scenario database. It should be noted that each test scenario and corresponding data may be stored in association with a test scenario identifier. As such, multiple test scenarios may be executed simultaneously or in series using all or a portion of computer nodes available for testing.

Having described a high level overview of the system functions, an exemplary system facilitating these and other features will now be described.

FIG. 1 illustrates a system 100 for performing realistic performance testing of an electronic trading venue ("ETV") via distributed computer nodes each physically connected to a network device of the electronic trading venue, according to an implementation of the invention.

System 100 may include one or more client devices 104 (illustrated in FIG. 1 as clients 104A, 104B, 104N), a master test controller 110, a plurality of physically distinct computer nodes 120 (illustrated in FIG. 1 as node 120A, 120B, 120C, 120N), which are each physically connected to network device 130 via respective physical connections (illustrated as connections 122A, 122B, 122C, 122N), an electronic trading venue 140 (also referred to interchangeably as ETV 140), and a test scenario database 112. Each of the components of system 100 may be coupled to one another via a network. In the description that follows, reference will be made to FIGS. 1-3.

Client devices 104 may be configured to receive test scenario parameters and provide them to master test controller 110. For example, a developer may use a client device 104 to design and upload a test scenario, which is received by master test controller 110. Master test controller 110 may be configured as a server (e.g., having one or more server blades, processors, etc.), a personal computer (e.g., a desktop computer, a laptop computer, etc.), and/or other device that can be programmed to execute a test scenario as described herein. Master test controller 110 may include one or more physical processors 212, one or more storage devices 214, and/or other components. Processors 212 may be programmed by one or more computer program instructions. For example, processors 212 may be programmed by a scenario design interface 220, a master test control application 222, a scenario analyzer 224, and/or other instructions.

The scenario design interface 220 may provide one or more interfaces to receive test scenario parameters. For instance, an interface may include a graphical user interface, a file transfer interface (e.g., FTP or other file transfer protocol), and/or other type of interface. In this manner, the master test controller 110 may enable users (e.g., developers or other testing users) to design, upload, and implement various test scenarios. In some instances, the scenario design interface 220 may maintain a set of template test scenarios, including template executable code, that may be used as-is and/or modified by developers to suit particular needs. In this manner, a user may customize or otherwise use (without customization) an already predefined test scenario. Once a test scenario has been designed (including any relevant test parameters), scenario design interface 220 may transmit the test scenario to test scenario database 112 for storage.

Test Scenarios

A test scenario may include various test parameters used to execute a network test of a computer network based on multiple distinct computer nodes 120 that each have physical connections to a network device of the network. In particular, a test scenario may include test parameters used to test the fairness of an electronic trading venue 140 based on a set of distributed computer nodes 120 that each are programmed to simulate data packet transmissions to and/or from the electronic trading venue.

The test parameters may include, for example, test initiation information indicating when the test scenario should be started, test termination information indicating when the test scenario should terminate, computer executable code to be transmitted to individual nodes 120 for execution at individual nodes, and/or other parameters that specify the test scenario. The test initiation information may include a starting date and/or time. Likewise, the test termination information may include an ending date and/or time.

Alternatively or additionally, the test initiation information may include some other triggering event, such as when a cluster of N number of nodes 120 is available for testing. Again likewise, the test termination information may include some other triggering event, such as when a certain volume of network traffic has been tested (e.g., based on data packets transmitted to and/or from a node 120).

The computer executable code may define the behavior of a node 120 that receives the code. For example, and without limitation, the computer executable code may include Java .class files that can be run by each node 120. Other types of programming languages and code may be used as well.

Whichever type of programming code is used, the computer executable code transmitted to a node 120 may program that node to perform various actions. These actions may be encoded into the code to simulate market participant activity or other network activity with real-world (non-testing) conditions. Non-limiting examples of actions may include subscribing to market data, executing a simulated trading strategy, entering bids and/or offers on instruments trading at the electronic trading venue, and/or performing other actions to simulate network traffic to and/or from a computer network and in particular to an electronic trading venue.

The computer executable code—which may vary on a per recipient (e.g., node) basis—may specify which instruments on the ETV to subscribe to, the manner in which to subscribe to them (e.g., market-by-order, market-by-price, full depth or top N-levels of depth, conflated or real-time, etc.) depending on what market data subscription options are offered by the ETV. The executable code may also specify when, on what instrument(s), at what size and quantity each individual single-board computer should send orders, cancels and replace requests to the ETV.

Examples of trading strategies coded in this way may include a first trading strategy (a "pegging to top of book" strategy) in which the participant seeks to join top of book on an instrument on one or both sides, but not to be alone at the top of book. Responsive to each market data update, and respecting any Minimum Quote Life (MQL) constraints on the instrument, the code comprising the strategy would seek to replace or cancel orders when they become "alone at top" and submit new orders to "join" existing top of book.

A second trading strategy in which as a function of the system clocks (which may be synchronized using the Precision Time Protocol (PTP)), the node 120 may be programmed to enter bids and/or offers on certain instruments. For instance, at each 100 ms interval throughout the second such code may specify that a new bid be entered at a price level 1.xxx where xxx is the number of milliseconds past the second that the order is entered. Additionally, on the whole second (i.e., 000 ms) all such open bids are canceled and a new single bid is entered at 1.000.

In addition to or instead of the foregoing trading strategies, the computer executable code may program a node 120 to alter its behavior. For instance, the computer executable code may program a node 120 to implement a custom TCP/IP stack that deviates from the TCP/IP specification. As such, the computer executable code may program the node 120 to implement a custom TCP/IP stack instead of a built-in TCP/IP stack ordinarily implemented by the node.

The custom TCP/IP stack may intentionally perform one or more of the following: omit required fields, send packets out-of-order, send bad-checksums, send acks for packets not yet received, force connection from a fixed port number, force sending more packets beyond the advertised window of the receiver, and/or otherwise deviate from the TCP/IP specification. The foregoing may simulate a market's participant's attempt to "game" communications with an electronic trading venue to reduce its latency.

The foregoing examples of trading strategies and behaviors are non-limiting examples. Other trading strategies and behaviors may be encoded by computer executable code for transmission to and execution by a node 120 as well.

Executing a Test Scenario

The master test control application 222 may examine a test scenario for execution. For instance, when a scenario initiation trigger is detected (e.g., when a developer indicates a test should be conducted, when a starting time has occurred, and/or when other testing conditions have occurred), the master test control application 222 may obtain, from the test scenario database 112, test parameters associated with the test scenario. The master test control application 222 may identify computer nodes 120 that are available to participate in the network test and transmit computer executable code and/or other parameters to each of a plurality of computer nodes 120, which are physically distinct from one another. A computer node 120 may be available for participating if, for example, it has enough capacity to execute a test, is currently idle, is part of a larger set of nodes 120 (such as in a server rack), and/or is otherwise deemed to be capable of executing the computer executable code to participate in the test scenario.

In some implementations, the test scenario may specify that different nodes 120 be provided and programmed with different computer executable code to each implement different strategies. In these implementations, master test control application 222 may transmit a first set of computer executable code to a first node 120 and a second set of computer executable code (different than the first set of computer executable code) to a second node 120. The first set of computer executable code may program the first node 120 to implement the first trading strategy and the second set of computer executable code may program the second node 120 to implement the second trading strategy. Thus, both strategies in a single test scenario may simulate a more realistic market that includes nodes 120 each with a "natural interest" and each performing market marking and risk management. Other strategies and/or behaviors and other numbers of strategies and/or behaviors may be implemented in a single test scenario as well. Furthermore, other numbers of nodes 120 may each be provided with the same or different computer executable code.

In an implementation, master test control application 222 may transmit a file or other information that includes the test initiation information and/or the test termination information along with the computer executable code they are to load and run at the start time, and terminate at the termination time. In these instances, the nodes 120 participating in a given test scenario may be time-synchronized to one another using conventional time-syncing techniques so that they can begin executing their respective computer executable code at the appropriate times and terminate the test at appropriate times.

In some instances, the master test control application 222 may transmit the test parameters to each node 120 via a file transfer protocol (e.g., SFTP) and/or other data transmission protocol or technique. In some instances, the master test control application 222 may multicast the test parameters to each node 120 so that they receive the parameters at substantially the same time (and may accordingly start at substantially the same time instead of or in addition to the time-syncing described above).

In some implementations, the test scenario may specify particular ones of the nodes 120 to participate, a number of nodes 120 that should be used (including a minimum number, a maximum number, a specific number, etc.), and/or other specification of nodes. In some implementations, the master test control application 222 may automatically select nodes 120 to participate in the test scenario from among available nodes. Particular nodes 120 may be identified based on a node identifier (e.g., an IP address, a MAC address, etc.) that uniquely identifies a node. These node identifiers may be stored in the node ID database 111.

Nodes 120

In an implementation, each node 120 may include one or more processors 312, one or more storage devices 314, a test agent 320, and/or other components. The one or more storage devices 314 may store the test agent 320, which programs the node 120 to periodically poll the master test controller 110 to pull test parameters and/or receive a pushed set of test parameters from the master test controller. In either instance, the test agent 320 may obtain the test parameters and configure the node 120 to act in accordance with the test parameters, including causing the processor 312 to execute computer executable code from the master test controller 110.

The test agent 320 may load and execute the computer executable code (e.g., by launching a Java Virtual Machine at the specified time with the specified main class when JAVA.class code is used). The test agent 320 may, after the test has completed write any errors encountered or success criteria to a log file, and these log files may be uploaded to the test scenario database 112 in association with a test scenario identifier that identifies the test scenario.

In an implementation, to reduce the cost of purchasing, racking in a data center, powering, cooling, and administrating a large number of computers for a test bed, each of the nodes 120 may include a low cost single-board computer. For example, and without limitation, each node 120 may include a Raspberry Pi device. In these implementations, these single board computers may be clustered in a data center for participation in a test scenario.

During execution of a test scenario, a node 120 may send orders to and receive market data and acknowledgements for orders from network device 130 (of ETV 140). Network device 130 may forward all messages (e.g., in the form of data packets) it sends and receives from the nodes 120 to both: (i) test scenario database 112 and (ii) an intended recipient (whether a node 120 or the ETV 140). The network device 130 may do so in various ways.

For example, the network device 130 may forward the messages via port mirroring, in which all messages received and sent on designated ports are timestamped with their sending/receiving time at the network device itself, and forward the messages from output port(s) on the network device to an intended recipient. The intended recipient may include one or more nodes 120, and the messages may be transmitted to test scenario database 112 for storage therein. In this manner, the network device 130 may generate and obtain a time of receipt of the messages (e.g., data packets). Alternatively or additionally, the network device 130 may obtain a time of transmission of the messages from each of the nodes 120.

In a particular example, the nodes 120 may include edge node(s) of a Hadoop cluster, and the messages (timestamped network packets) may be transmitted to and stored in a file system such as HDFS. Other types of distributed computing and storage systems may be used as well.

In some implementations, multiple mirrored output ports may be required if the bandwidth utilized by the nodes 120 exceeds that of a single mirrored output port. In this case, multiple edge nodes and multiple distinct files may also be written to in the Hadoop cluster or other technology used to implement the test scenario database 112. The format of the files may be the raw format in which data is received so that WireShark™ or other similar application or library can read those files. The files may be named based on the number of the output port to which they are connected, and the date and time on which they are created. Whichever technology is used to implement the test scenario database 112, the messages/data packets transmitted to the database may be stored in association with a scenario ID identifying the test scenario that was executed.

In another example in which the network device 130 forwards all messages it sends and receives from the nodes 120 to both the test scenario database 112 and the intended recipient, the network device 130 may employ a network tap device, in which all messages received and sent on designated ports are timestamped with their sending/receiving time at the network device itself, and transmitted through the network tap device, which is connected to both output ports to recipients and the test scenario database 112.

Assessing the Test Scenario

In an implementation, scenario analyzer 224 may obtain the test data associated with a test scenario. For instance, timestamped data packets stored in association with the scenario ID may be obtained from the test scenario database 112. The content of the timestamped data packets may then be processed and assessed by scenario analyzer 224 based on the timestamps and content of the packets. In a particular example, the scenario analyzer 224 may determine a temporal fairness of the ETV 140 based on the timestamped data packets, in a manner consistent with that described in U.S. patent application Ser. No. 14/930,499, entitled, "Systems and methods for quantifying temporal fairness on electronic trading venues," filed on Nov. 2, 2015, the contents of which are incorporated in its entirety herein.

For example, the scenario analyzer 224 may obtain market activity information associated with a first node 120 and a second node 120. One such form of market activity information may indicate messages received by the ETV 140 at network device 130 from nodes 120 relating to an instrument traded on the ETV. Such messages may relate to, without limitation, orders (e.g., new order requests, cancel requests, replace requests, etc.). Another such form of market activity may indicate messages sent by the ETV 140 to the nodes 120 relating to an instrument traded on the ETV. Such messages may relate to, without limitation, market data updates (e.g., credit screened snapshots of the instrument's limit order book, unscreened snapshots of it, etc.).

The scenario analyzer 224 may further determine, based on the market activity information, a first plurality of time deltas that each indicate an amount of time in which the first market node 120 has temporally beaten the second node 120 with respect to a form of market activity related to an instrument traded on the electronic trading venue.

The scenario analyzer 224 may, based on the market activity information, a second plurality of time deltas that each indicate an amount of time in which the second node 120 has temporally beaten the first node 120 with respect to that same form of market activity related to the instrument traded on the electronic trading venue.

The scenario analyzer 224 may determine a quantified level of temporal fairness as a scalar value having unit time with respect to the first node 120 and the second node 120 on the electronic trading venue based on the first plurality of time deltas and the second plurality of time deltas. This scalar value with unit time determined by the scenario analyzer 224 may be such that the magnitude of the value indicates the degree of temporal unfairness, with larger values indicating a higher degree of temporal unfairness and smaller values indicating a lower degree of temporal unfairness. A scalar value of zero may indicate temporal unfairness has been eliminated and thus temporal fairness has been achieved.

The scenario analyzer 224 may, in analyzing a first and second plurality of time deltas for a pair of nodes' 120 market activity on an instrument relating to market data update messages, determine a minimum value for "$f_{mktdata}$", given $f_{mktdata} \geq 0$, such that the number of values strictly greater than $f_{mktdata}$ in the first plurality of time deltas plus "X" is approximately equal to the number of values strictly greater than $f_{mktdata}$ in the second plurality of time deltas plus "X". Typically, the value of "X" will be determined by counting the number of values across the both pluralities of time deltas that are less than or equal to $f_{mktdata}$, and halving that count.

The scenario analyzer 224 may, in analyzing a first and second plurality of time deltas for a pair of nodes' 120 market activity on an instrument relating to order messages, determine a minimum value for "$f_{ords}$", given $f_{ords} \geq 0$, such that the number of values strictly greater than $f_{ords}$ in the first plurality of time deltas plus "Y" is approximately equal to the number of values strictly greater than $f_{ords}$ in the second plurality of time deltas plus "Y". Typically, the value of "Y" will be determined by counting the number of values that are less than or equal to $f_{ords}$ across a third and fourth plurality of time deltas related to that same pair of participants and instrument, and halving that count.

The system may, on a per instrument basis, determine a quantified level of temporal fairness with unit time for an instrument on that venue, by finding a single minimum $f_{mktdata}$ value and separately a single minimum $f_{ords}$ value such that the criteria described above is met for each pair in a plurality of pairs of nodes 120 on that instrument (and not just a single pair as described above), and summing those two minimum "f" values together. This sum may subsequently be used to inform the "floor value" or "delay period" of an Ideal Latency Floor or other such mechanism deployed on the venue for that instrument. Alternatively, for simplicity, the maximum such sum across a plurality of instruments on the venue may be used to inform the value of an Ideal Latency Floor, and that maximum sum may reflect the temporal fairness of the venue as a whole. Assessing the fairness of an ETV is further described at U.S. patent application Ser. No. 14/930,499, which has been incorporated into this disclosure.

In a particular example, Map Reduce or Spark jobs may be implemented in Hadoop to analyze the temporal fairness based off the timestamps in the captured network data based on the temporal fairness quantification system disclosed in U.S. patent application Ser. No. 14/930,499.

In some instances, additional metrics may also be captured such as the worst-case "delta" between sending the same data to the first participant (i.e., a first node 120), and the last participant (i.e., a last node 120) (an effect which may manifest even when the IP Multicast protocol is used to send data to a plurality of participants).

Figure 4:
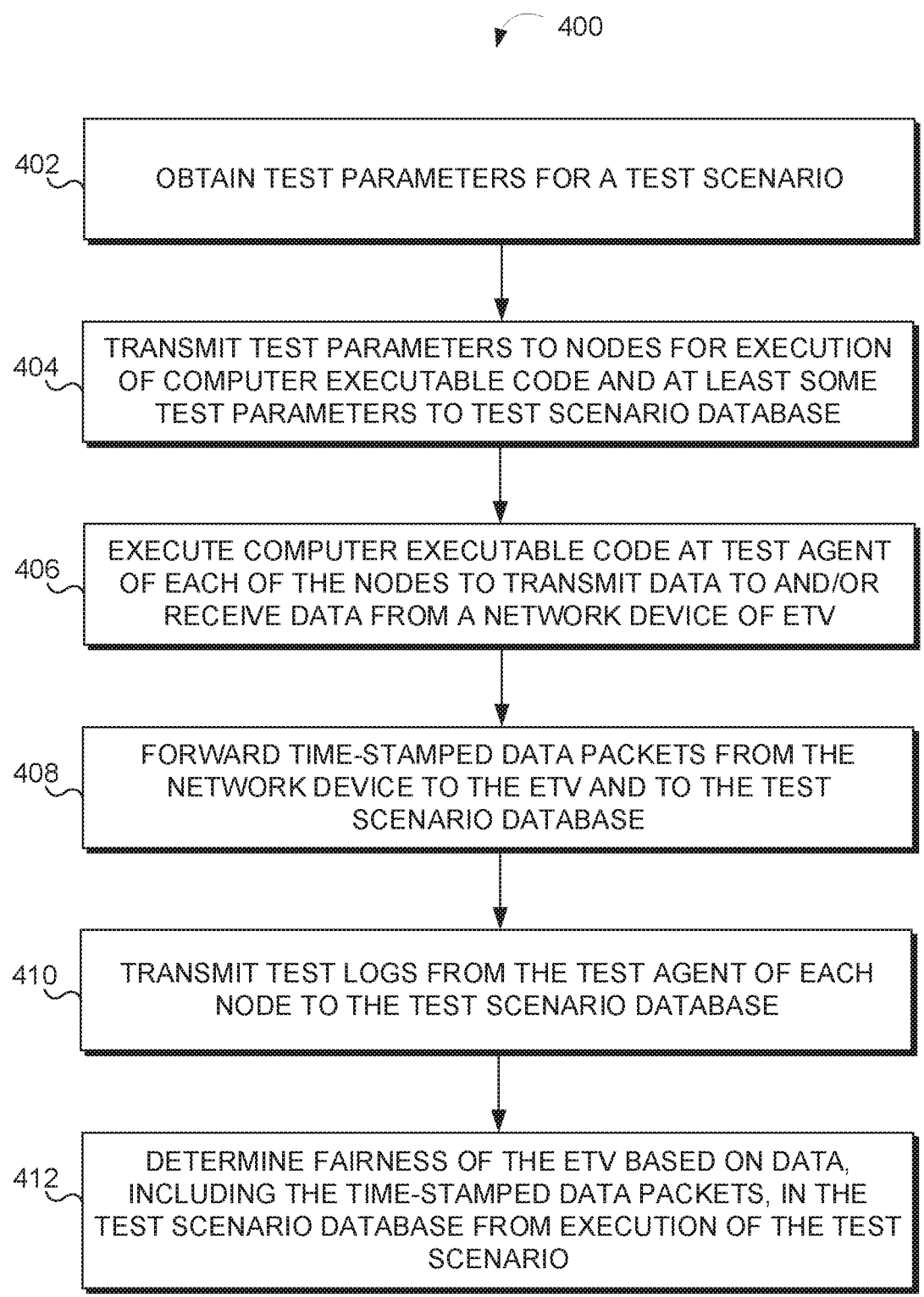
FIG. 4 illustrates a process of performing realistic performance testing of an electronic trading venue based on distributed computer nodes each physically connected to a network device of the electronic trading venue, according to an implementation of the invention.

FIG. 4 illustrates a process 400 of performing realistic performance testing of an electronic trading venue 140 based on distributed computer nodes 120 each physically connected to a network device 130, according to an implementation of the invention.

In an operation 402, process 400 may include obtaining test parameters for a test scenario.

In an operation 404, process 400 may include transmitting the test parameters to, including computer executable code for execution at, a plurality of nodes 120. At least some of the parameters (e.g., test settings) may be transmitted for storage at a test scenario database 112. The parameters may be stored in association with a scenario identifier that identifies the test scenario.

In an operation 406, process 400 may include executing, at a test agent 320 of a node 120, the computer executable code transmitted to the node. Each of the nodes 120 participating in execution of the test scenario may perform this operation.

In an operation 408, process 400 may include forwarding time-stamped data packets from the network device 130 to the ETV 140 and to the test scenario database 112.

In an operation 410, process 400 may include transmitting, from the test agent 320 of a node 120, test logs to the test scenario database 112. Each of the nodes 120 participating in execution of the test scenario may perform this operation.

In an operation 412, process 400 may include determining a fairness of the ETV 140 based on the data in the test scenario database for the test scenario.

As used herein, the term "computer executable code" includes software programming code that is interpreted or compiled to program a processor. In some compiled implementations, compiled code may be transmitted to nodes 120 while in other compiled implementations source code may be transmitted to nodes 120 (in which case each node 120 may compile the source code).

Although illustrated in FIG. 1 as a single component, master test controller 110 (also referred to interchangeably as computer system 110) and each node 120 may each include a plurality of individual components (e.g., computer devices) each programmed with at least some of the functions described herein. In this manner, some components of master test controller 110 and/or node 120 may perform some functions while other components may perform other functions, as would be appreciated. The one or more processors 212, 312 may each include one or more physical processors that are programmed by computer program instructions. The various instructions described herein are exemplary only. Other configurations and numbers of instructions may be used, so long as the processor(s) 212, 312 are programmed to perform the functions described herein.

Figure 2:
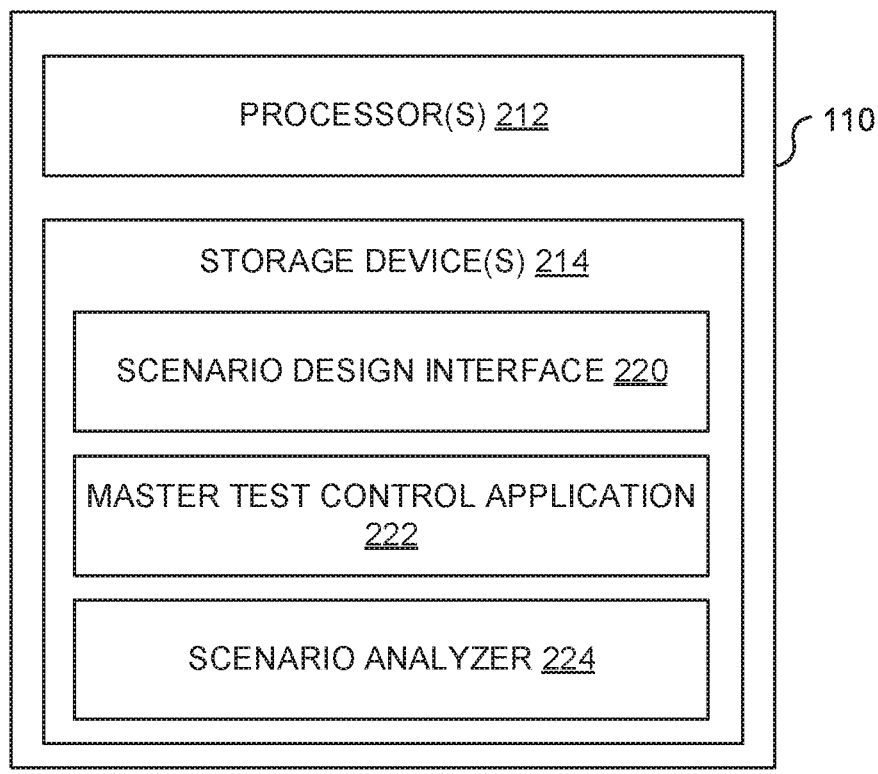
FIG. 2 illustrates a master test controller that generates test scenarios based on user input and executes the test scenarios by transmitting computer executable code to a plurality of distributed computer nodes that each simulate a market participant, according to an implementation of the invention.
Figure 3:
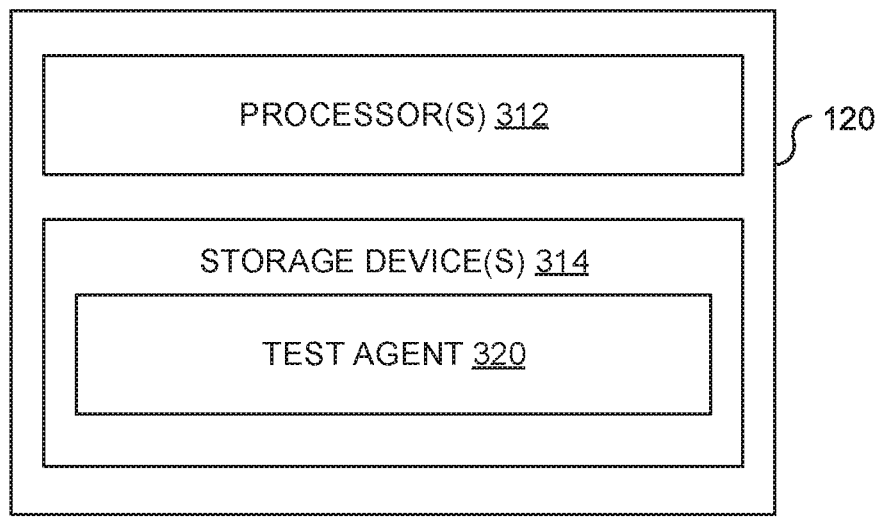
FIG. 3 illustrates a computer node having an agent that accepts computer executable code form the master test controller and transmits and receives data to and from a network device to which it is physically connected based on the computer executable code, according to an implementation of the invention.

Furthermore, it should be appreciated that although the various instructions are illustrated in FIGS. 1-3 as being co-located within a single processing unit, in implementations in which processor(s) 212, 312 includes multiple processing units, one or more instructions may be executed remotely from the other instructions.

The description of the functionality provided by the different instructions described herein is for illustrative purposes, and is not intended to be limiting, as any of the instructions may provide more or less functionality than is described. For example, one or more of the instructions may be eliminated, and some or all of its functionality may be provided by other ones of the instructions. As another example, processor(s) 212, 312 may be programmed by one or more additional instructions that may perform some or all of the functionality attributed herein to one of the instructions.

The various instructions described herein may be stored in a storage device 214, 314 which may comprise random access memory (RAM), read only memory (ROM), and/or other memory. The storage device may store the computer program instructions (e.g., the aforementioned instructions) to be executed by processor 212, 312 as well as data that may be manipulated by processor 212, 312. The storage device may comprise floppy disks, hard disks, optical disks, tapes, or other storage media for storing computer-executable instructions and/or data.

The various databases 111, 112 described herein may be, include, or interface to, for example, an Oracle™ relational database sold commercially by Oracle Corporation. Other databases, such as Informix™, DB2 (Database 2) or other data storage, including file system-based (e.g., Hadoop HDFS), or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system of performing network testing of temporal fairness in an electronic trading venue using a plurality of physical computing nodes each physically distinct from one another and connected to a network device, and each programmed to send corresponding requests to the electronic trading venue via the network device to simulate activities of a market participant, comprising:

a computer system comprising one or more physical processors programmed with computer program instructions that, when executed by the one or more physical processors, programs the computer system to:
receive an identification of a test scenario to execute, the test scenario simulating one or more activities of a plurality of market participants on the electronic trading venue;
obtain, based on the identification of the test scenario, first computer executable code that programs a target physical computing node to simulate a first market participant that transmits or receives data packets to or from the electronic trading venue via the network device, wherein the first computer executable code is stored in association with the test scenario;
obtain, based on the identification of the test scenario, second computer executable code that programs a target physical computing node to simulate a second market participant different from the first market participant that transmits or receives second data packets to or from the electronic trading venue via the network device, wherein the second computer executable code is stored in association with the test scenario;
identify at least a first set of physical computing nodes among the plurality of physical computing nodes to receive the first computer executable code, each of the first set of physical computing nodes being physically distinct from other ones of the plurality of physical computing nodes, and each connected to the network device via respective physical connections;
identify at least a second set of physical computing nodes among the plurality of physical computing nodes to receive the second computer executable code, each of the second set of physical computing nodes being physically distinct from other ones of the plurality of physical computing nodes, and each connected to the network device via respective physical connections;

transmit the first computer executable code to each of the identified first set of physical computing nodes;

transmit the second computer executable code to each of the identified second set of physical computing nodes;

monitor a first parameter of first data packets transmitted to or received from the first set of physical computing nodes monitor a second parameter of second data packets transmitted to or received from the second set of physical computing nodes; and determine performance of the electronic trading venue during execution of the test scenario by comparing the first parameter and second parameter.

2. The system of claim 1, wherein:
the first parameter is a time of receipt of the first data packets measured at the network device;
the second parameter is a time of receipt of the second data packets measured at the network device; and
to determine the performance of the electronic trading venue, the computer system is programmed to determine a level of temporal fairness of the electronic trading venue as a scalar value based on comparing the first and second parameters.

3. The system of claim 1, wherein:
the first parameter is a time of transmission of the first data packets measured at each corresponding node;
the second parameter is a time of transmission of the second data packets measured at each corresponding node; and
to determine the performance of the electronic trading venue, the computer system is programmed to determine a level of temporal fairness of the electronic trading venue as a scalar value based on comparing the first and second parameters.

4. The system of claim 1, further comprising the network device, wherein the network device is configured to:
inject a network-level timestamp to each of the first data packets transmitted to or received from at least each of the first set of physical computing nodes;
transmit each of the first data packets injected with the network-level timestamp to its intended recipient; and
transmit a copy of each of the first data packets injected with the network-level timestamp to a test scenario storage for later retrieval and analysis.

5. The system of claim 4, wherein the first data packets injected with the network-level timestamp are transmitted to the intended recipient and test scenario storage using port mirroring.

6. The system of claim 1, wherein the first computer executable code, when executed, programs each of the first set of physical computing nodes to:
simulate a first trading strategy with respect to a first financial instrument trading on the electronic trading venue.

7. The system of claim 6, wherein the second computer executable code, when executed, programs each of the second set of physical computing nodes to:
simulate a second trading strategy with respect to the first financial instrument trading on the electronic trading venue to simulate competitive activity.

8. The system of claim 1, wherein the first computer executable code, when executed, programs each of the first set of physical computing nodes to:
implement a custom version of a communication protocol that deviates from a standard specification for the communication protocol.

9. The system of claim 8, wherein the communication protocol comprises a TCP/IP protocol, and wherein the custom version deviates from the standard specification based on at least one of: omission of one or more required fields, transmission of packets out-of-order, transmission of bad-checksums, transmission of acks for packets not yet received, forced connection from a fixed port number, or forced transmission of packets beyond an advertised window of a receiver.

10. The system of claim 1, wherein at least each of the first set of physical computing nodes is programmed with a test agent that programs each of the first set of physical computing nodes to receive the first computer executable code from the computer system, and execute the test scenario according to the first computer executable code.

11. The system of claim 10, wherein the test agent programs each of the first set of physical computing nodes to generate log data that logs execution of the test scenario, and transmit the log data to a test scenario database.

12. The system of claim 1, wherein:
the first parameter is a first plurality of time deltas that each indicate an amount of time in which the first set of physical computing nodes has temporally beaten the second set of physical computing nodes during execution of the test scenario;
the second parameter is a second plurality of time deltas that each indicate an amount of time in which the second set of physical computing nodes has temporally beaten the first set of physical computing nodes during execution of the test scenario; and
to determine the performance of the electronic trading venue, the computer system is programmed to determine a level of temporal fairness of the electronic trading venue as a scalar value based on comparing the first and second parameters.

13. The system of claim 1, wherein the network device is further configured to:
inject a network-level timestamp to each of the first data packets transmitted to or received from at least each of the first set of physical computing nodes and the second data packets transmitted to or received from the second set of physical computing nodes;
transmit each of the first data packets injected with the network-level timestamp and the second data packets injected with the network-level timestamp to its intended recipient;
transmit a copy of each of the first data packets injected with the network-level timestamp and the second data packets injected with the network-level timestamp to a test scenario storage;
retrieve one or more of the copies the first data packets injected with the network-level timestamp and the second data packets injected with the network-level timestamp from the test scenario storage; and
determine performance of the electronic trading venue during execution of the test scenario by comparing the injected network level timestamps of the one or more retrieved copies of the first data packets as the first parameter and the injected network level timestamps of the one or more retrieved copies of the second data packets as the second parameter.

14. A computer implemented method of performing network testing of temporal fairness in an electronic trading venue using a plurality of physical computing nodes each physically distinct from one another and connected to a network device, and each programmed to send corresponding requests to the electronic trading venue via the network device to simulate activities of a market participant, the method being implemented on a computer system having one or more physical processors that programs the computer system to perform the method, the method comprising:

receiving, by the computer system, an identification of a test scenario to execute, the test scenario simulating one or more activities of a plurality of market participants on the electronic trading venue;

obtaining, by the computer system, based on the identification of the test scenario, first computer executable code that programs a target physical computing node to simulate a first market participant that transmits or receives data packets to or from the electronic trading venue via the network device, wherein the first computer executable code is stored in association with the test scenario;

obtaining, by the computer system, based on the identification of the test scenario, second computer executable code that programs a target physical computing node to simulate a second market participant different from the first market participant that transmits or receives second data packets to or from the electronic trading venue via the network device, wherein the second computer executable code is stored in association with the test scenario;

identifying, by the computer system, at least a first set of physical computing nodes among the plurality of physical computing nodes to receive the first computer executable code, each of the first set of physical computing nodes being physically distinct from other ones of the plurality of physical computing nodes, and each connected to the network device via respective physical connections;

identifying, by the computer system, at least a second set of physical computing nodes among the plurality of physical computing nodes to receive the second computer executable code, each of the second set of physical computing nodes being physically distinct from other ones of the plurality of physical computing nodes, and each connected to the network device via respective physical connections;

transmitting, by the computer system, the first computer executable code to each of the identified first set of physical computing nodes;

transmitting, by the computer system, the second computer executable code to each of the identified second set of physical computing nodes;

monitoring, by the computer system, a first parameter of first data packets transmitted to or received from the first set of physical computing nodes monitoring, by the computer system, a second parameter of second data packets transmitted to or received from the second set of physical computing nodes; and determining, by the computer system, performance of the electronic trading venue during execution of the test scenario by comparing the first parameter and second parameter.

15. The method of claim 14, wherein:
the first parameter is a time of receipt of the first data packets measured at the network device;
the second parameter is a time of receipt of the second data packets measured at the network device; and
determining the performance of the electronic trading venue comprises determining, by the computer system, a level of temporal fairness of the electronic trading venue as a scalar value based on comparing the first and second parameters.

16. The method of claim 14, wherein:
the first parameter is a time of transmission of the first data packets measured at each corresponding node;
the second parameter is a time of transmission of the second data packets measured at each corresponding node; and
determining the performance of the electronic trading venue comprises determining, by the computer system, a level of temporal fairness of the electronic trading venue as a scalar value based on comparing the first and second parameters.

17. The method of claim 14, the method further comprising:
injecting, by the network device, a network-level timestamp to each of the first data packets transmitted to or received from at least each of the first set of physical computing nodes;
transmitting, by the network device, each of the first data packets injected with the network-level timestamp to its intended recipient; and
transmitting, by the network device, a copy of each of the first data packets injected with the network-level timestamp to a test scenario storage for later retrieval and analysis.

18. The method of claim 17, wherein the first data packets injected with the network-level timestamp are transmitted to the intended recipient and test scenario storage using port mirroring.

19. The method of claim 14, the method further comprising:
simulating, by each of the first set of physical computing nodes, a first trading strategy with respect to a first financial instrument trading on the electronic trading venue.

20. The method of claim 19, the method further comprising:
simulating, each of the second set of physical computing nodes, a second trading strategy with respect to the first financial instrument trading on the electronic trading venue to simulate competitive activity.

21. The method of claim 14, the method further comprising:
implementing, by each of the first set of physical computing nodes, a custom version of a communication protocol that deviates from a standard specification for the communication protocol.

22. The method of claim 21, wherein the communication protocol comprises a TCP/IP protocol, and wherein the custom version deviates from the standard specification based on at least one of: omission of one or more required fields, transmission of packets out-of-order, transmission of bad-checksums, transmission of acks for packets not yet received, forced connection from a fixed port number, or forced transmission of packets beyond an advertised window of a receiver.

23. The method of claim 14, wherein at least each of the first set of physical computing nodes is programmed with a test agent, wherein the method further comprises:
receiving, by each of the first set of physical computing nodes, the first computer executable code from the computer system; and
executing, by each of the first set of physical computing nodes, the test scenario according to the first computer executable code.

24. The method of claim 23, wherein the method further comprising:
  generating, by each of the first set of physical computing nodes, log data that logs execution of the test scenario; and
  transmitting, by each of the first set of physical computing nodes, the log data to a test scenario database.

25. The method of claim 14, wherein:
  the first parameter is a first plurality of time deltas that each indicate an amount of time in which the first set of physical computing nodes has temporally beaten the second set of physical computing nodes during execution of the test scenario;
  the second parameter is a second plurality of time deltas that each indicate an amount of time in which the second set of physical computing nodes has temporally beaten the first set of physical computing nodes during execution of the test scenario; and
  determining the performance of the electronic trading venue comprises, determining, by the computer system, a level of temporal fairness of the electronic trading venue as a scalar value based on comparing the first and second parameters.

26. The method of claim 14, the method further comprising:
  injecting, by the computer system, a network-level timestamp to each of the first data packets transmitted to or received from at least each of the first set of physical computing nodes and the second data packets transmitted to or received from the second set of physical computing nodes;
  transmitting, by the computer system, each of the first data packets injected with the network-level timestamp and the second data packets injected with the network-level timestamp to its intended recipient;
  transmitting, by the computer system, a copy of each of the first data packets injected with the network-level timestamp and the second data packets injected with the network-level timestamp to a test scenario storage;
  retrieving, by the computer system, one or more of the copies the first data packets injected with the network-level timestamp and the second data packets injected with the network-level timestamp from the test scenario storage; and
  determining, by the computer system, performance of the electronic trading venue during execution of the test scenario by comparing the injected network level timestamps of the one or more retrieved copies of the first data packets as the first parameter and the injected network level timestamps of the one or more retrieved copies of the second data packets as the second parameter.

* * * * *